United States Patent [19]

Shimaoka et al.

[11] Patent Number: 4,646,176

[45] Date of Patent: Feb. 24, 1987

[54] RECORDING AND REPRODUCING APPARATUS INCLUDING A CASSETTE LOADING DETECTING DEVICE

[75] Inventors: Motohiro Shimaoka; Yukio Saito, both of Furukawa, Japan

[73] Assignee: Alps Electric Co., Ltd., Japan

[21] Appl. No.: 563,872

[22] Filed: Dec. 21, 1983

[30] Foreign Application Priority Data

Dec. 21, 1982 [JP] Japan .............................. 57-192129[U]

[51] Int. Cl.⁴ .............................................. G11B 17/04
[52] U.S. Cl. ........................................ 360/97; 360/99
[58] Field of Search ................................... 360/97–99, 360/86, 93, 133, 96.5, 96.6; 242/198

[56] References Cited

U.S. PATENT DOCUMENTS 3,936,011  2/1976  Staar ............................. 360/96.5 X
4,539,613  9/1985  Suyama et al. ....................... 360/99

Primary Examiner—John H. Wolff
Assistant Examiner—David J. Severin
Attorney, Agent, or Firm—Guy W. Shoup

[57] ABSTRACT

A recording/reproducing device including a cam which permits a cartridge holder to descend and assume a loaded state, a lock for locking the cam so as to hold the cartridge holder in the lock state before loading, and a detector for detecting that a disc cartridge has been inserted up to a predetermined position in the cartridge holder. The locked state of the cam is released upon detection of proper insertion of the cartridge, thereby allowing the cartridge holder to descend until it assumes the loaded state. Unless the disc cartridge is inserted in the predetermined position in the cartridge holder, the cartridge holder cannot assume the loaded state, thus permitting the recording/reproducing device to be used always in a normal condition.

6 Claims, 4 Drawing Figures ated portion 8 for the shutter 6. The shutter operating portion 8 is connected to the shutter 6 and is urged resiliently at all times in the direction of closing the magnetic head insertion aperture 5.
RECORDING AND REPRODUCING APPARATUS INCLUDING A CASSETTE LOADING DETECTING DEVICE

BACKGROUND OF THE INVENTION (1.) Field of the Invention:

The present invention relates to a recording/reproducing device using a disc cartridge.

(2.) Description of the Prior Art:

Recently, there has been developed a recording/reproducing device of the type in which a disc cartridge formed of a hard material and enclosing a magnetic disc rotatably therein is inserted up to a predetermined position in a cartridge holder which is mounted within the recording/reproducing device, whereby the cartridge holder is loaded so as to press the turntable for rotating the magnetic disc or the magnetic head, now ready for recording and playback.

According to this type of a conventional recording/reproducing device, however, the cartridge sometimes strikes against a part of the cartridge holder before reaching the predetermined position in the cartridge holder. In this case, if the cartridge inserting operation is continued, the cartridge holder assumes the foregoing loaded state in that position of the cartridge, so that it becomes impossible to effect recording or playback and the fore end of the magnetic disk may strike a part of the apparatus and become damaged.

SUMMARY OF THE INVENTION

It is the object of the present invention to provide a recording/reproducing device which can eliminate the above-mentioned drawbacks of the prior art and which does not assume the loaded state before the disc cartridge reaches the predetermined position in the cartridge holder.

In order to achieve the above object, the recording/reproducing device of the present invention is characterized by including a cam member which permits a cartridge holder to descend and assume the loaded state, a locking means for locking the cam member so as to hold the cartridge holder in the state before loading, and a detector means for detecting that a disc cartridge has been inserted up to a predetermined position in the cartridge holder, the locked state of the cam member by the locking means being released upon detection of such inserted state by the detector means thereby allowing the cartridge holder to go down until it assumes the loaded state.

DESCRIPTION OF A PREFERRED EMBODIMENT

Figure 1:
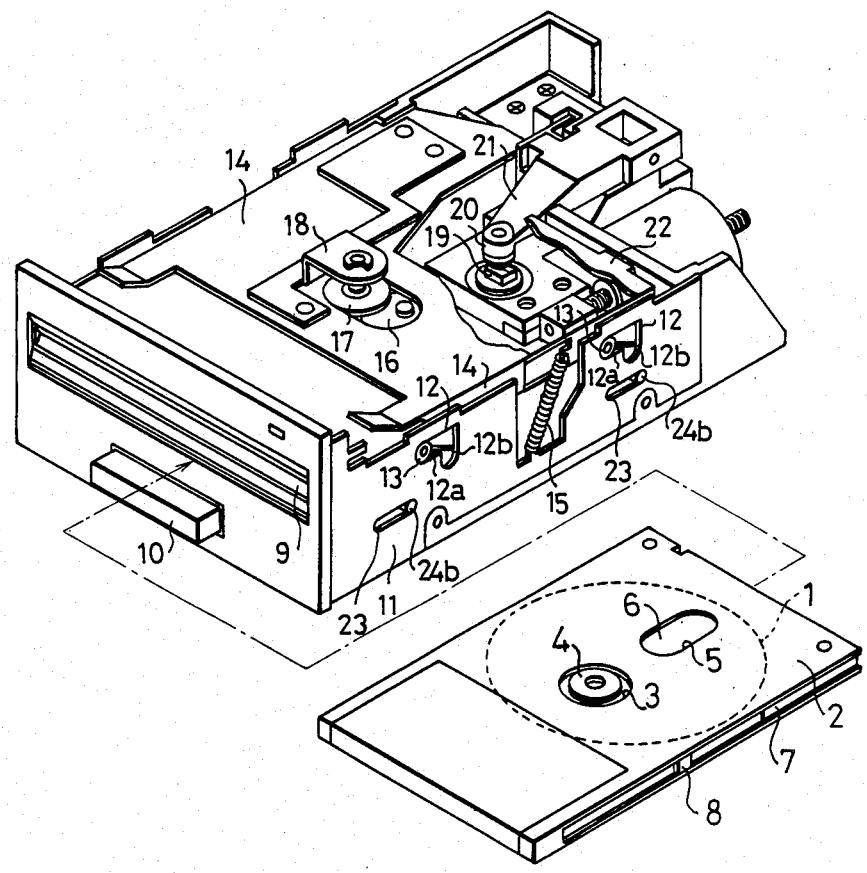
FIG. 1 is a schematic perspective view of a recording/reproducing device according to an embodiment of the present invention.

An embodiment of the present invention will be described hereinunder with reference to the accompanying drawings.

A magnetic disc 1 is rotatably enclosed in a cartridge 2 which is formed of a hard synthetic resin; a hub 4 which centrally holds the magnetic disc 1 is exposed to a through hole 3 formed centrally in the cartridge 2; and a shutter which comprises a metallic plate is disposed pivotably under a magnetic head insertion aperture 5 formed in a predetermined position of the cartridge 2. The cartridge 2 is formed with grooves 7 in both sides thereof, in one of which is slidably fitted a shutter operating portion 8 for the shutter 6. The shutter operating portion 8 is connected to the shutter 6 and is urged resiliently at all times in the direction of closing the magnetic head insertion aperture 5.

Figure 2:
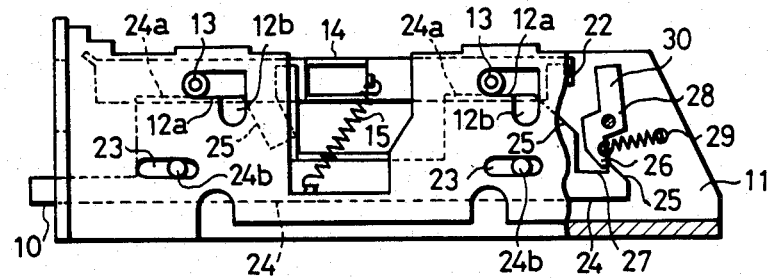
FIG. 2 is a side view showing principal components thereof in a non-operating state.

On the other hand, a cartridge insertion opening 9 and an eject button 10 are provided at the front frame portion of the recording/reproducing device. Behind the cartridge insertion opening 9 is disposed a cartridge holder 14 provided at side portions thereof with rollers 13 which are guided along ⌐-shaped slots 12 formed in both side portions of a frame 11. The cartridge holder 14 is urged downwards and in the front frame direction at all times by means of a tension spring 15 fixed at an inclined angle to the frame 11. In an unloaded state of the cartridge holder 14, the roller 13 is held in the fore end position of a horizontal portion 12a of the ⌐-shaped slot 12 by means of the tension spring 15, as shown in FIG. 2. Further, as shown in FIG. 1, on the front upper portion of the cartridge holder 14 is mounted a receiving portion 18 for a pressing portion 17 which presses the hub 4 of the magnetic disc 1 against a turntable 16, while on the rear upper surface of the cartridge holder 14 is formed an abutting portion, in opposed relation to a magnetic head 19, for pushing up an arm 21 with a pad 20 attached thereto when the roller 13 of the cartridge holder 14 is located in the horizontal portion 12a of the ⌐-shaped slot 12. Further, at the rear end of the cartridge holder 14 is formed a bent portion 22 for abutment with the fore end of the cartridge 2.

To the eject button 10 is connected a push-up cam 24 provided at side portions thereof with pins 24b which are guided by slots 23 formed in the side portions of the frame 11. The cam 24 has an inclined portion 25 capable of abutting the roller 13 in a vertical portion of the ⌐-shaped slot 12. While the recording/reproducing device is not in operation, a flat portion 24a of the cam 24 is positioned in the vertical portion 12b by the action of a locking means as will be described later to prevent the roller 13 from moving to the vertical portion 12b.

Figure 3:
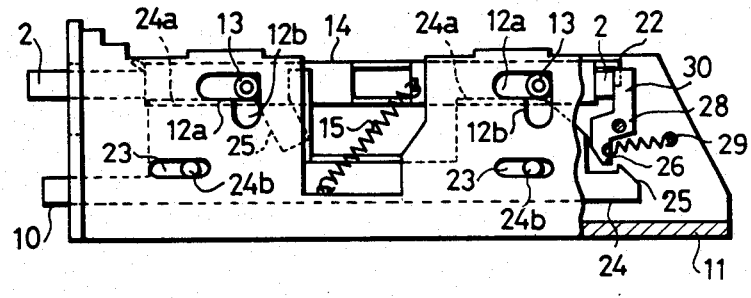
FIG. 3 is a side view showing principal components thereof in an operating state.
Figure 4:
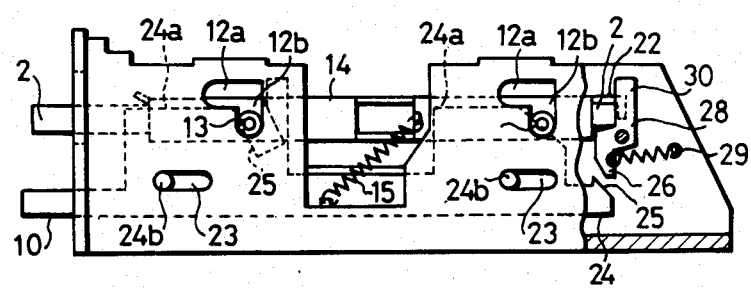
FIG. 4 is a top view thereof showing a released state of a locking means.

As shown in FIGS. 2 through 4, a locking means 26 comprises a lever 28 which is engageable with a recess 27 formed in the inclined portion 25 of the cam 24. The lever 28, which is pivotably secured to the frame 11, is urged counterclockwise by a spring 29 so as to pull the cam 24 to the right in FIG. 2. The upper end of the lever 28 is positioned at the rear end portion of the cartridge holder 14 so that it can abut the fore end of the cartridge 2, and thus serves as a detector means 30 for detecting the presence of the cartridge 2. The bent portion 22 at the rear end of the cartridge holder 14 is formed in a position where it does not abut the upper end of the lever 28.

Therefore, when the cartridge 2 is inserted from the cartridge insertion opening 9 and the fore end of the cartridge 2 pushes the detector means 30 of the lever 28, the lever 28 pivotally moves clockwise against the spring 29, whereby the engagement or lock between the recess 27 and the locking means 26 is released. In this case, if the roller 13 is positioned so that its center approaches the inclined portion 25 from the flat portion 24a, then, upon release of the locked state, a force which urges the inclined portion 25 to the left through the roller 13 is given by the tension spring 15, so that the cam 24 moves to the left, the roller 13 moves to the lower part of the vertical portion 12b and the cartridge holder 14 is also urged downward and assumed the loaded state, whereupon the hub 4 of the magnetic disc 1 is urged against the turntable 16 by the pressing portion 17 attached to the cartridge holder 14, and the magnetic disc 1 is now ready to rotate. On the other hand, since the shutter 6 is held in its open position by an opening/closing pin (not shown) disposed in the vicinity of the cartridge insertion opening 9, that is, the magnetic head insertion aperture 5 of the cartridge 2 is open, the pad 20 attached to the fore end of the arm 21 goes down as the cartridge holder 14 is forced down, whereby the magnetic disc 1 is urged against the magnetic head 19, now ready for recording and playback.

When the cartridge 2 is inserted from the cartridge insertion opening 9, if it should strike against a part of the cartridge holder 14 before reaching the bent portion 22 for some reason or other, for example, due to a dimensional error or wear, with the result that only the cartridge holder 14 moves before the cartridge 2 reaches the predetermined position and the roller 13 reaches above the vertical portion 12b of the ⊓-shaped slot 12, the lever 28 does not move so the cam 24 is held in the locked state by the locking means 26 because the fore end of the cartridge 2 does not abut the detector means 30 which is positioned at the rear end portion of the cartridge holder 14. Therefore, the roller 13 cannot move from the flat portion 24a downwardly to the vertical portion 12b of the ⊓-shaped slot 12, that is, the descent of the cartridge holder 14, namely, its transfer to the loaded state, is prevented.

For returning the cartridge holder 14 from the loaded state to the unloaded state, the eject button 10 is pushed inwards, whereupon the roller 13 positioned in the lower part of the vertical portion 12b of the ⊓-shaped slot 12 is pushed up by the inclined portion 25 of the push-up cam 24, so that the roller goes up while being held by the inclined portion 25 and the vertical portion 12b of the ⊓-shaped slot 12. When the roller 13 reaches the horizontal portion 12a, it is no longer in abutment with the inclined portion 25, so it is moved to the fore end of the horizontal portion 12a by the action of the tension spring 15 of the cartridge holder 14. With this movement of the roller 13, the cartridge holder 14 also moves up toward the cartridge insertion opening 9 and assumes the state before loading.

According to the present device having the above-described construction, unless the cartridge is inserted up to the predetermined position in the cartridge holder, the cartridge holder cannot assume the loaded state, thus permitting the recording/reproducing device to be used always in a normal condition.

What is claimed is:

1. A recording and reproducing apparatus having a front opening for insertion of a disk cartridge to be loaded or unloaded to or from an operative position for recording and reproducing in the apparatus, comprising:
    a cartridge holder for receiving a disk cartridge inserted therein, said cartridge holder being movable to or from the operative position;
    a movable cam having an inclined portion in abutting engagement with a portion of said cartridge holder so that said cam is moved as said cartridge holder is moved to the operative position;
    locking means including a lock portion on said cam which locks said cam from moving so to hold said cartridge holder in an unloaded state if said disk cartridge is not fully inserted in the apparatus; and
    detector means for detecting when a disk cartridge has been inserted to a predetermined position in said cartridge holder and for thereupon releasing said locking means to unlock said cam thereby allowing said cartridge holder to be moved to the operative position.

2. A recording/reproducing device according to claim 1, wherein said cartridge holder is provided with rollers, said rollers beig each disposed in a ⊓-shaped slot formed in each of side portions of a frame, and wherein said cartridge holder is brought into the loaded state from the state before loading by moving said roller along said ⊓-shaped slot by means of an inclined portion of said cam.

3. A recording/reproducing device according to claim 1, wherein said detector means comprises a lever adapted to engage said cam and also adapted to abut the disc cartridge enclosed in said cartridge holder.

4. A recording/reproducing device according to claim 3, wherein said lever is adapted to engage and lock said cam in the state before loading, and when the cartridge inserted in said cartridge holder abuts said lever, said lever is pivotally moved to unlock said cam.

5. A recording/reproducing device according to claim 4, wherein said lever is urged in a direction opposing the direction in which the cartridge is forced in.

6. A recording/reproducing device according to claim 4, wherein the surface of abutment of said lever with the cartridge is formed along the moving path of the cartridge.

* * * * *